United States Patent [19]

Powers

[11] Patent Number: 4,575,235

[45] Date of Patent: Mar. 11, 1986

[54] PHOTOGRAPHIC PRINTING APPARATUS AND METHODS

[75] Inventor: John W. Powers, Battlefield, Mo.

[73] Assignee: Western Litho Plate & Supply Co., St. Louis, Mo.

[21] Appl. No.: 618,588

[22] Filed: Jun. 8, 1984

[51] Int. Cl.⁴ .................... G03B 27/04; B65G 47/96
[52] U.S. Cl. ........................ 355/97; 355/99; 414/749
[58] Field of Search .............. 355/97, 85, 99, 89; 269/56; 414/222, 749; 100/224

[56] References Cited

U.S. PATENT DOCUMENTS

| | | |
|---|---|---|
| 3,635,559 | 1/1972 | Harrell et al. ..................... 355/85 |
| 3,810,694 | 5/1974 | Harrell et al. ..................... 355/85 X |
| 4,003,476 | 1/1977 | Laskey ................................ 414/749 |
| 4,353,647 | 10/1982 | Harrell et al. ..................... 355/85 |
| 4,408,950 | 10/1983 | Laskey ................................ 414/749 |
| 4,423,955 | 1/1984 | Powers ................................ 355/85 X |

Primary Examiner—L. T. Hix
Assistant Examiner—Della Rutledge
Attorney, Agent, or Firm—Senniger, Powers, Leavitt and Roedel

[57] ABSTRACT

An apparatus for and method of exposing lithographic plates to light through films in which plates are brought into an exposure station for exposure alternately on first and second platens, each movable from a loading position outside the exposure station to an exposure position.

6 Claims, 5 Drawing Figures

PHOTOGRAPHIC PRINTING APPARATUS AND METHODS

BACKGROUND OF THE INVENTION

This invention relates to photographic printing apparatus and methods, and more particularly to apparatus and methods for carrying photosensitive plates, and especially lithographic plates, through exposure operations.

The invention is in the same field as and is a further development on the apparatus and methods disclosed in the coassigned U.S. Pat. Nos. 3,635,559, 3,810,694, 4,353,647 and 4,423,955 and involves modifications thereof, and particularly modifications of the apparatus and method disclosed in U.S. Pat. No. 4,423,955.

SUMMARY OF THE INVENTION

Among the several objects of the invention may be noted the provision of apparatus for and a method of exposing photosensitized plates, and particularly lithographic plates, to light through films, with a new mode of feeding plates into position for being exposed with reduced time between exposures; and the provision of such an apparatus and method enabling exposed plates to be discharged from the exposure station to a plate processor.

In general, apparatus of this invention is operable to expose photosensitized plates to light through films at an exposure station and comprises a first platen for holding a plate to be exposed movable from a loading position at a loading station outside the exposure station to an exposure position at the exposure station for exposure of the plate, and movable back to loading position for reloading after the plate has been exposed, a second platen for holding a plate to be exposed movable from a loading position at the loading station below the loading position of the first platen to an exposure position at the exposure station for exposure of the plate thereon, and movable back to loading position for reloading after the plate has been exposed; and a window at the exposure station movable downwardly from a raised open position to press a film down on the plate on either the first or second platen at the exposure station for exposure of the plate to light through the window and film.

The method of this invention comprises loading a first platen with a plate at a loading station outside the exposure station with the platen in a generally horizontal loading position at the loading station, moving said first platen with the plate thereon into the exposure station along a generally horizontal path, lowering a window at the exposure station and pressing a film down on the plate on said first platen for exposure of the plate to light through the window and film, exposing the plate on the first platen to light through the window and the film, raising the window, and removing the exposed plate from the first platen at the exposure station. It further comprises loading a second platen with a plate at the loading station with the second platen in a generally horizontal loading position at the loading station vertically displaced from the loading position of the first platen moving the first platen out of the exposure station back to its loading position, moving said second platen with the plate thereon into the exposure station along a second generally horizontal path vertically displaced from the path of the first platen, lowering the window and pressing a film down on the plate on said second platen, exposing the plate on the second platen to light through the window and the film, raising the window, removing the exposed plate from the second platen at the exposure station, and repeating the steps for successively exposing plates one after another at the exposure station.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 5:
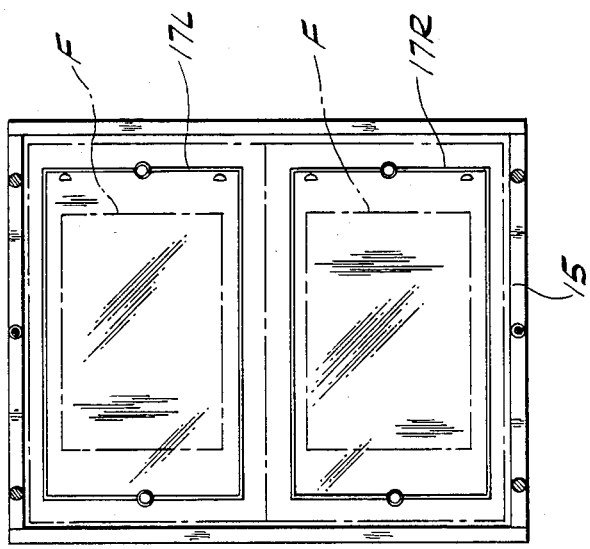
FIG. 5 is a view of a window of the apparatus.

The apparatus of this invention utilizes many of the features of the apparatus disclosed in the aforesaid U.S. Pat. No. 4,423,955, to which reference may be made for details. Referring to the drawings here, there is indicated at 9 an exposure station corresponding generally to the exposure station 9 shown in said U.S. patent. At the exposure station is an exposure window 15 movable up and down by air cylinder means 16 for engagement of its lower face with a film F on a plate P to be exposed. This window 15, like that shown in U.S. Pat. No. 4,423,955, has left and right-hand sets of vacuum grooves 17L and 17R in its lower face as indicated in FIG. 5 for vacuum gripping a film to its lower face for raising the film along with the window away from a plate.

For bringing plates P into the exposure station 9 for exposure, the apparatus has a first platen 21 and a second platen 23, one being operable to bring a plate (or two plates side-by-side) into the exposure station and hold it there for an exposure operation while the other is being loaded with a plate. Each of these platens is structured generally the same as the platen 11 of the aforesaid U.S. Pat. No. 4,423,955 to the extent of having registration pins 71, vacuum grooves and a sealing strip like said platen 11 of said patent. However, where said platen 11 is fixed in position at the exposure station, platens 21 and 23 move into and back out of the exposure station. Thus, each of the platens 21 and 23 is movable from a loading position at a loading station 25 outside the exposure station to an exposure position at the exposure station for exposure of a plate P on the platen to light through the window 15 and a film F, and movable back to loading position for reloading after the plate has been exposed. The loading position and exposure position for platen 21 are designated 21L and 21E; the loading position and exposure position for platen 23 are designated 23L and 23E. The platen 21 is horizontally slidable between its loading and exposure positions 21L and 21E on rails 27 by means of a cable cylinder 29. The platen 23 is horizontally slidable between its loading and exposure positions 23L and 23E in a horizontal plane below that of platen 21 on rails 31 by means of a cable cylinder 33. Thus, the loading positions 23L of platen 23 is directly below the loading position 21L of platen 21, and the exposure position 23E of platen 23 is directly below the exposure position 21E of platen 21.

At 35 is indicated a discharge means for picking up an exposed plate off the platen 21 or 23, as the case may be, and delivering it to a conveyor (not shown) for feeding it to a plate processor. This discharge means corresponds generally to the discharge carriage 19 shown in the aforesaid U.S. Pat. No. 4,423,955, except that is film grippers may be omitted, and the conveyor corresponds to the conveyor 209 shown in said patent. It is to be understood that the discharge carriage may be operable in transverse direction rather than longitudinal direction as in said patent.

Figure 1:
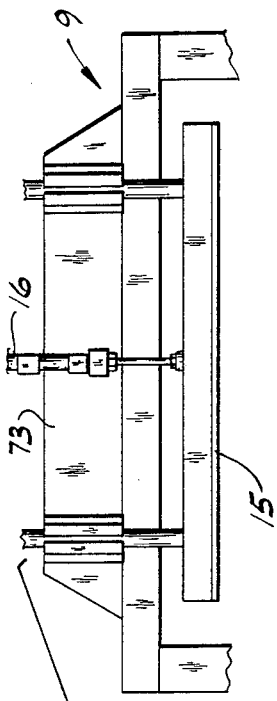
FIGS. 1-3 are views showing the feeding of plates to an exposure station for exposure of the plates to light through films in accordance with this invention.
Figure 2:
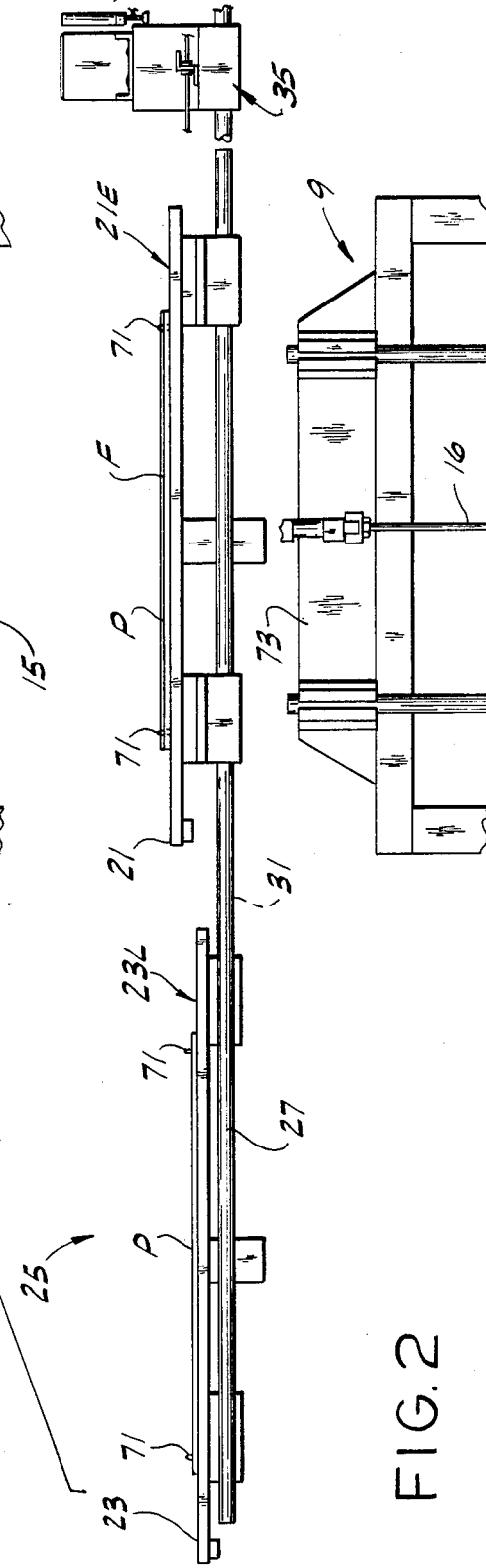

FIG. 1 shows the upper platen 21, which may be referred to as the first platen, in its exposure position 21E at the exposure station, directly below the raised window, and shows the lower platen 23, which may be referred to as the second platen, back in its loading position 23L at the loading station. On the first platen 21 is a plate P and on the plate P is a film F, both having been previously loaded on the platen 21 at the loading station, and brought into the exposure station by moving the platen 21 with the plate and film thereon into the exposure station along the generally horizontal path of platen 21. The window 15 is lowered, engages the film, and presses the film down on the plate P on the first platen as shown in FIG. 2 for exposure of the plate to light from light source 73 through the window and the film. The light source is energized to expose the plate to light through the window and film for an appropriate interval. The window is raised following the exposure of the plate, and, assuming a plurality of plates are to be exposed through the same film, the film is gripped to the lower face of the window and raised therewith away from the exposed plate. The discharge means 35 is brought in over the exposed plate (as in the aforesaid U.S. Pat. No. 4,423,955), and operated to pick up the plate and transfer it to the above-noted conveyor for delivery to the plate processor.

Figure 3:
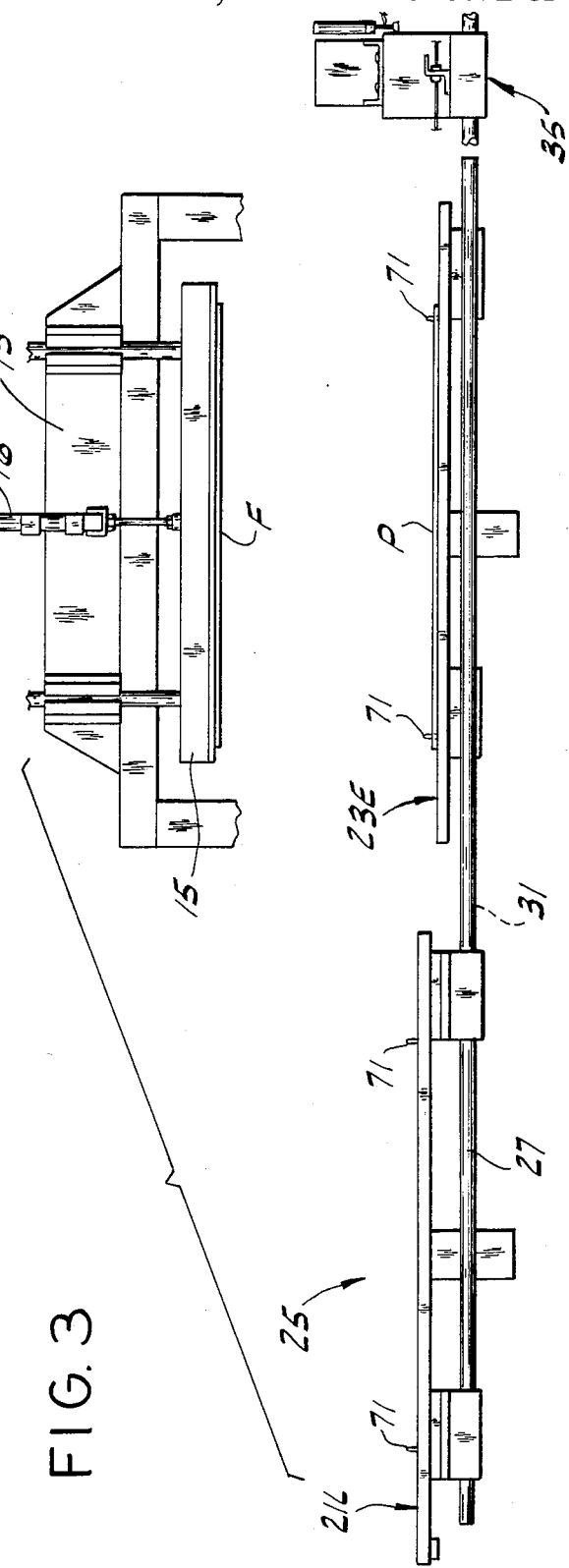
Figure 4:
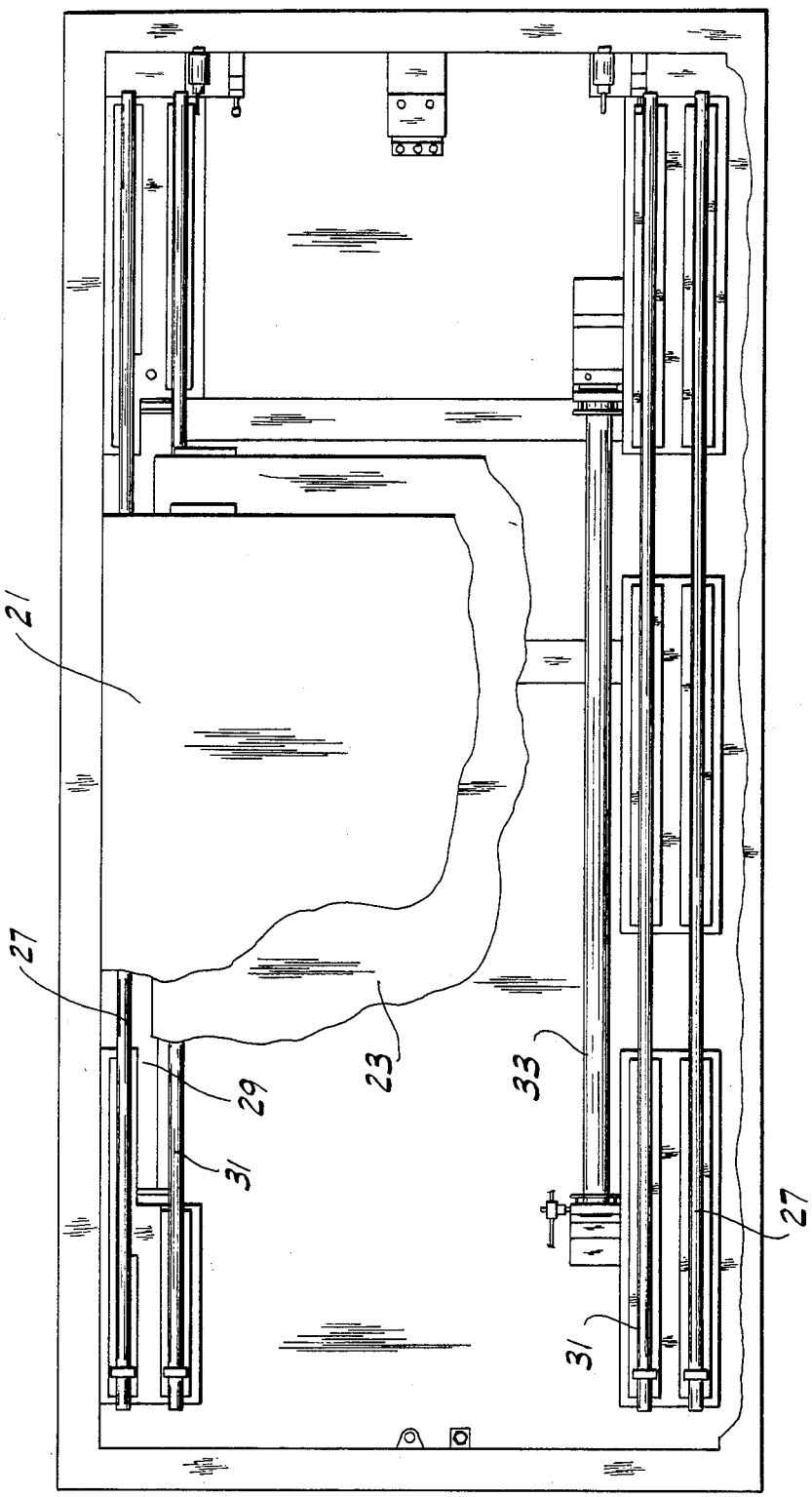
FIG. 4 is a plan with parts broken away showing certain details.

While the plate P on platen 21 is being exposed at the exposure station (FIG. 2), a plate P is loaded on the second platen 23 at the loading station. It is to be noted that access to the top of the platen 23 is unobstructed, since platen 21 is in the exposure station. Then the first platen 21 is moved out of the exposure station back to its loading position, and the second platen 23 with the next plate P to be exposed is moved into the exposure station bringing said next plate to exposure position under the window 15 (FIG. 3). The latter is lowered, bringing the film on its bottom face down on the plate P and pressing the film down on the plate P on the second platen 23. The plate is exposed to light through the window and film, the window is raised, the exposed plate is removed by the discharge means 35, and the steps are repeated for successively exposing plates one after another at the exposure station. The film is retained on the window when the window is raised as many times as needed for exposing a desired number of plates to light through that film. When that number of plates have been exposed, the film is released to come down onto one or the other of the platens, as the case may be, and carried back to the loading station for manual removal.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for exposing photosensitized plates to light through films at an exposure station comprising:
    a first platen for holding a plate to be exposed;
    first fixed guide means for guiding the first platen for movement of the first platen from a loading position at a loading station outside the exposure station to an exposure position at the exposure station for exposure of the plate, and back to loading position for reloading after the plate has been exposed;
    said first guide means holding said first platen in a first generally horizontal plane at a first level in its said loading position, throughout its movement, and in its said exposure position;
    a second platen for holding a plate to be exposed;
    second fixed guide means for guiding the second platen for movement of the second platen from a loading position at the loading station below the loading position of the first platen to an exposure position at the exposure station below the exposure position of the first platen for exposure of the plate on the second platen, said second platen being movable back to its loading position for reloading after the plate thereon has been exposed;
    said second guide means holding said second platen at a lower level in a second generally horizontal plane below the first generally horizontal plane in its said loading position, throughout its movement, and in its second exposure position; and
    a window at the exposure station movable downwardly from a raised open position to press a film down on either the first platen at the first level at the exposure station or the second platen at the second and lower level at the exposure station for exposure of the plate to light through the window and film.

2. Apparatus as set forth in claim 1 wherein the first fixed guide means comprises a first pair of rails and the second fixed guide means comprises a second pair of rails between the rails of the first pair, the first platen bridging the rails of the first pair and overlying the rails of the second pair.

3. Apparatus as set forth in claim 1 having means for removing an exposed plate from either platen at the exposure station.

4. Apparatus as set forth in claim 3 wherein the window has means associated therewith for gripping a film to its bottom whereby the film may be raised with the window for exposing plates brought into the exposure station on the first and second platens to light through that film.

5. The method of exposing photosensitized plates to light through films at an exposure station comprising:
    loading a first platen with a plate at a loading station outside the exposure station with the platen in a first generally horiziontal plane at a first level at the loading position;
    moving said first platen with the plate thereon within said first generally horizontal plane by means of a first fixed guide means into the exposure station;
    lowering a window at the exposure station and pressing a film down on the plate on said first platen at the first level at the exposure station for exposure of the plate to light through the window and film;
    exposing the plate on the first platen to light through the window and the film;

raising the window;
removing the exposed plate from the first platen at the exposure station;
loading a second platen with a plate at the loading station with the second platen in a second generally horizontal plane at a second level at the loading station vertically displaced from the loading position of the first platen;
moving the first platen within said first horizontal plane out of the exposure station back to its loading position at said first level;
moving said second platen with the plate thereon within said second generally horizontal plane by means of a second fixed guide means into the exposure station;
lowering the window and pressing a film down on the plate on said second platen at the second level;
exposing the plate on the second platen to light through the window and the film;
raising the window;
removing the exposed plate from the second platen at the exposure station; and
repeating the steps for successively exposing plates one after another at the exposure station.

6. The method of claims 4 wherein a film is retained on the window when the window is raised for exposing a number of plates to light through that film.

* * * * *